United States Patent [19]

McMaster et al.

[11] 4,240,816

[45] Dec. 23, 1980

[54] METHOD AND APPARATUS FOR FORMING TEMPERED SHEET GLASS WITH A PYROLYTIC FILM IN A CONTINUOUS PROCESS

[76] Inventors: Harold A. McMaster, 420 Walter St., Woodville, Ohio 43469; Norman C. Nitschke, 9102 Buck Rd., Perrysburg, Ohio 43551

[21] Appl. No.: 10,573

[22] Filed: Feb. 9, 1979

[51] Int. Cl.³ .................. C03B 27/00; C03C 17/27
[52] U.S. Cl. .................. 65/60 R; 65/60 B; 65/60 D; 65/160; 65/163; 65/181; 65/350; 427/419.4; 427/419.6
[58] Field of Search .................. 65/60 R, 60 A, 60 C, 65/60 D, 160, 163, 181, 350; 427/419 C, 419.13, 419.1, 419.2, 419.3, 419.4, 419.5, 419.6

[56] References Cited

U.S. PATENT DOCUMENTS

| | | | |
|---|---|---|---|
| 3,762,902 | 10/1973 | Wagner et al. | 65/60 R |
| 3,880,633 | 4/1975 | Jordan et al. | 65/60 A |
| 3,996,035 | 12/1976 | McHenry | 65/60 D |
| 4,123,244 | 10/1978 | LeClercq et al. | 65/60 D |

*Primary Examiner*—Arthur D. Kellogg
*Attorney, Agent, or Firm*—Reising, Ethington, Barnard, Perry & Brooks

[57] ABSTRACT

A method and apparatus for filming and tempering a pre-cut glass sheet in a continuous process. The glass sheet is heated initially to a temperature sufficient for pyrolysis. The heated glass is sprayed with a coating composition which reacts with the glass to form a metal oxide film on its surface. The filmed glass is re-heated to both restore the heat lost by spraying and to bring its temperature to a level sufficient for tempering. The glass sheet is then tempered by subjecting it to rapid cooling. The method can be modified to include a secondary spraying wherein after the glass is first sprayed it is re-heated as in the initial step and then re-sprayed before completing the process. Apparatus for carrying out the above described method is also disclosed.

3 Claims, 6 Drawing Figures

METHOD AND APPARATUS FOR FORMING TEMPERED SHEET GLASS WITH A PYROLYTIC FILM IN A CONTINUOUS PROCESS

TECHNICAL FIELD

This invention relates generally to glass manufacture, and more particularly to a method and apparatus for manufacturing tempered sheet glass with a pyrolitic film in a continuous process.

BACKGROUND ART

At present there are many commercial and industrial applications for tempered glass having a pyrolytic film formed thereon. The pyrolytic film is typically a metal oxide which has been formed on the glass to give it a desired optical or electrical property. For example, a pyrolitic film can be applied to high performance architectural windows to reflect or absorb solar energy; or, may be applied to a glass sheet in another application to provide electrical conductivity.

The process by which a metal oxide film is formed on a sheet of glass is referred to as pyrolysis. In the process, a sheet of glass is heated to a temperature level sufficient for a coating composition to react on the surface of the glass; for many widely used compositions this temperature level is 1000° F. and above. The surface of the heated glass is then subjected to a spray of the coating composition which includes an inactive, vaporized liquid vehicle. When the coating composition meets the glass a metal oxide film is formed on the glass surface. The vaporized liquid vehicle and byproducts of the reaction are drawn off by a vacuum hood.

During filming of the glass some heat strengthening or semi-tempering is accomplished by the rapid cooling caused by the spray. In a tempering operation the glass is heated to the tempering temperature and then quickly cooled by blasts of cooling air on its surfaces to achieve a full temper.

The steps of pyrolysis and glass tempering are conventionally performed in two distinct operations by two different apparatus. The transfer and handling of glass between the apparatus normally permits the glass to cool significantly between operations. Thus there are normally two major heating cycles required to both film and temper the glass.

There are several distinct disadvantages associated with filming and tempering in separate operations. First, it is energy inefficient to require two basic heating steps, one for filming and another for tempering.

A second disadvantage resides in the fact that many types of metal oxide coatings are harmed by subsequent reheating after the pyrolysis step. More specifically, the film may fog, craze, thicken or lose some of its electrical conductivity by subjecting it to a second heating cycle. In fact, certain films presently used for high performance architectural windows do not have superior solar energy absorption, but are selected for their ability to withstand re-heating in the tempering step.

A third disadvantage is in the relatively greater manufacturing costs required to heat and re-heat the glass for respective filming and tempering steps.

The prior art does contain an apparatus in which filming takes place as part of a continuous operation as disclosed in Donley et al, U.S. Pat. No. 3,660,061, May 2, 1972. The Donley et al apparatus, however, is intended to accomplish all steps involved in manufacture of filmed glass, including the additional steps of forming a continuous ribbon from a molten bath, annealing and cutting. This apparatus requires high volume production for cost justification, and is not adapted to a typical operation where the filming and tempering are performed by the end user in a limited scale manufacturing operation on discrete sheets of glass. More specifically, the Donley et al apparatus performs the filming on a continuous glass ribbon after the ribbon has been drawn from a molten bath. The filmed glass is then annealed, cut and tempered to finish the manufacturing process. Stated otherwise, the Donley et al apparatus is not adapted to selected filming and tempering of the pre-cut sheet glass.

DISCLOSURE OF THE INVENTION

The present invention is a method and apparatus for both forming a pyrolytic film and fully tempering a sheet of glass in a continuous process.

Broadly, the process of the invention involves the following steps. Initially, a pre-cut sheet of glass is heated in a furnace to a temperature below that required for tempering, but sufficient for pyrolysis. The glass sheet is sprayed with a coating composition to form a pyrolytic film on its surface. The filmed sheet is then subjected to another stage of heating to bring it to a temperature sufficient for tempering. The glass sheet is then subjected to rapid cooling on both of its surfaces in a quench unit to temper the glass.

The steps of partial heating, spraying and final heating are all accomplished within a tempering furnace. The glass sheet is conveyed to the furnace on a roller conveyor through a first zone where it is partially heated, then past a second zone where it is sprayed, and finally through a third zone where the heat lost by spraying is restored and additional final heating is supplied to elevate the temperature of the glass to a level sufficient for tempering. The glass is then subjected to air blastheads in the quench unit.

If the glass is not of sufficient thickness to support the filming reaction for the time required for pyrolysis, nominally three seconds, then a modified cycle can be adopted. More specifically, the glass can be sprayed, reheated, and sprayed again before final heating. This may be accomplished by using a continuous furnace with five zones where the second and fourth zones are spraying stations; or, alternatively, by using an oscillating furnace with three stations where the glass sheet is shuttled back and forth between the spray head and initial heating zone until the pyrolysis operation is complete.

Other advantages of the present invention will be readily appreciated as the same becomes better understood with reference to the following detailed description when considered in connection with the accompanying drawings.

BEST MODE FOR CARRYING OUT THE INVENTION

Figure 1:
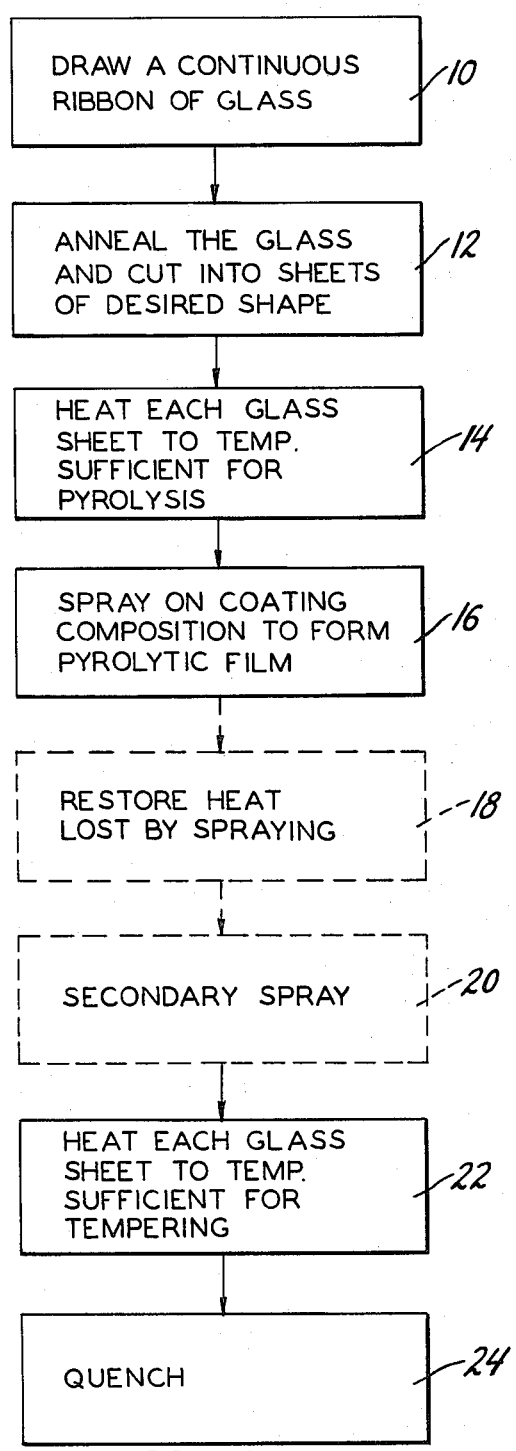
FIG. 1 is a flowchart of the steps involved in filming and tempering a sheet of glass in a continuous operation in accordance with the present invention.

FIG. 1 is a sequence of steps in which is represented the present method for filming and tempering a sheet of glass in a continuous process. Each of the steps illustrated will be described in more detail as follows.

In step 10, a continuous ribbon of glass is drawn from a molten bath. In step 12, the ribbon of glass is annealed and cut into a plurality of sheets of a desired shape. The steps 10 and 12 do not form an essential part of the present invention, as they are conventional and may be practiced either in conjunction with the continuous process of the present invention or at a time preceding the time in which the present method is carried out.

In step 14, each glass sheet is heated initially to increase its temperature to a level sufficient for pyrolysis. More specifically, the temperature obtained in step 14 is sufficient to cause a pyrolytic reaction to occur when a suitable coating composition is introduced onto a surface of the glass.

In step 116 the coating composition is sprayed onto the glass sheet to form a pyrolytic film on the glass. The film is typically a metal oxide, e.g. tin oxide.

The next two steps are optional and are performed only when a secondary spraying operation is required. Secondary spraying may be required where the glass sheet is insufficiently thick to store enough thermal energy to sustain the pyrolytic reaction with the glass for the time required for the reaction to take place, nominally three seconds. Generally, for glass having a thickness in excess of 5 mm the steps 18 and 20 are not required. However, for relatively thinner glass, the steps are performed.

More specifically, in step 18, the heat lost by the glass sheet from the spraying operation in step 16 is restored by re-heating the glass until it is again at a temperature sufficient for pyrolysis. In step 20, the glass sheet is subjected to a second spraying of coating composition.

In step 22, the glass sheet is again re-heated to both restore the heat lost by spraying (whether once or more times) and to bring the temperature of the glass to a level sufficient for tempering. The tempering temperature is normally between 1200°-1300° F.

In step 24, the glass sheet is quenched by subjecting it to rapid cooling. The cooling is commonly brought about by subjecting the surfaces of the glass to blasts of cool air.

Figure 2:
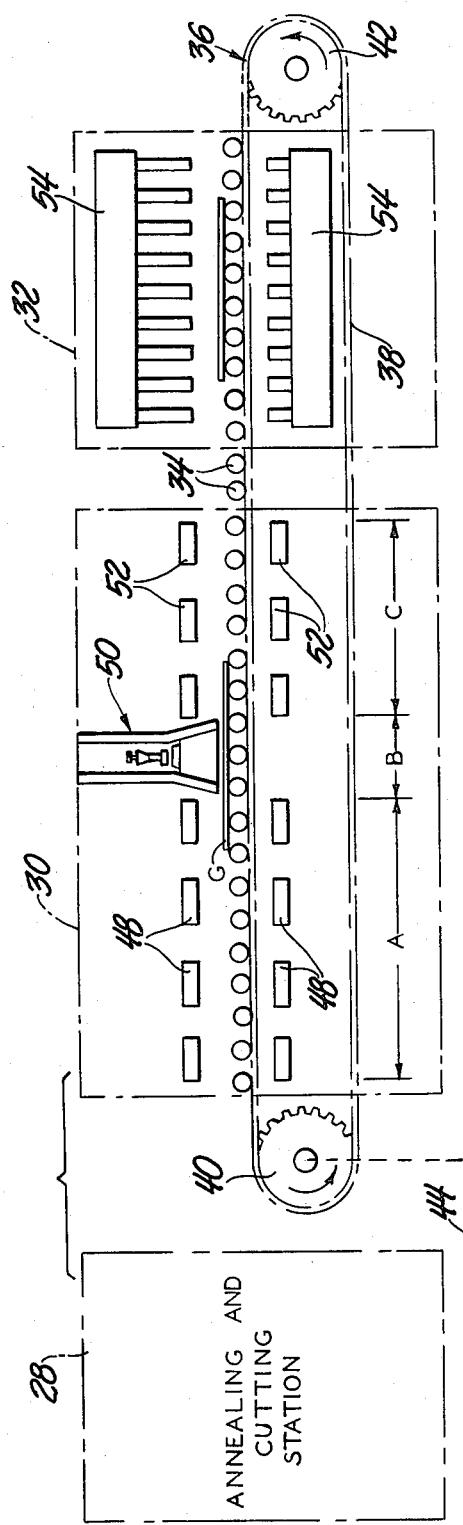
FIG. 2 is a schematic view of an apparatus for carrying out a continuous filming and tempering process in accordance with the present invention.

FIG. 2 is a schematic view of apparatus for carrying out the steps set forth in the flowchart of FIG. 1. The apparatus includes an annealing and cutting station 28. Again, it is to be noted that the glass forming, annealing and cutting operations can be carried out in conjunction with the continuous filming and tempering steps, or, may be done at a remote site from the filming and tempering apparatus.

The apparatus further includes a furnace 30 and a quench station 32. In overview, the heating and spraying of the glass sheet are performed in the furnace 30, and the rapid cooling is performed in the quench unit station 32.

A glass sheet G is transported through the furnace 30 and quench station 32 on a roller hearth formed of a plurality of elongated rollers 34 which are spaced from one another in parallel relation along the direction of glass travel. The roller hearth is supported by and in engagement with a conveyor drive, indicated generally at 36. The conveyor drive includes a continuous drive chain 38 trained over a pair of sprockets 40 and 42 disposed at opposite ends of the juxtaposed furnace 30 and quench station 32.

A motor 44 is connected in driving relation to the sprocket 40 to cause it to rotate in the direction indicated by the arrow. The motor 44 is controlled by a control unit 46. The motor 44 and control unit 46 can be a programmable drive system of the type that is disclosed in the co-pending application of Harold A. McMaster et al, entitled "Positioning System for Glass Transport Apparatus", U.S. Ser. No. 872,128, filed Jan. 25, 1978 now abandoned.

The embodiment of conveyor drive 36 shown herein is merely exemplary of alternative types of glass transport apparatus that could be used with the present invention. For example, two separate conveyor drives, one each for the furnace 30 and quench station 32, could be used.

The furnace 30 is divided into three distinct zones, A, B and C in which are performed certain of the steps relating to the flowchart of FIG. 1. Each of the zones A, B and C is presently discussed in greater detail.

The zone A of the furnace 30 is an initial heating zone in which the glass sheet G is heated to a temperature sufficient for pyrolysis. This zone includes heating elements 48 for controlled heating of the glass sheet. The initial heating in zone A corresponds to step 14 of FIG. 1.

The zone B comprises a spraying station, indicated generally at 50. In the spraying station, the upper surface of the glass sheet G is sprayed with a coating composition. The active ingredients of the coating composition are carried by an inactive, liquid vehicle. The coating composition is sprayed in atomized form onto the surface of the glass. The active ingredients react with the glass to form a pyrolytic film thereon. The liquid vehicle and by-products of the reaction are drawn off by a vacuum hood. The spraying station 50 will hereinafter be described in greater detail in connection with the description of FIG. 6. The spraying operation in zone B corresponds with step 16 of FIG. 1.

The zone C is a final heating zone in which the glass sheet G is brought up to a temperature sufficient for tempering. This zone comprises a plurality of heating elements 52 which provide controlled heating of the glass sheet. The final heating which occurs in zone C corresponds to step 22 of FIG. 1.

The quench station 32 provides the rapid cooling required to temper the glass once it has been heated to its tempering temperature. The quench station 32 includes a pair of upper and lower blastheads 54 which apply blasts of cool air onto the surfaces of the glass sheet G to effect tempering.

The transport of the glass sheet G through the furnace 30 and quench station 32 may be performed with continuous motion of the conveyor drive 36 or with a programmed shuttle cycle in which the glass sheet is shuttled two or more times through zones A and B. The second pass of the glass sheet corresponds to the reheating step 18 and secondary spraying step 20 of FIG. 1. This may be accomplished by appropriate programming of a shuttle cycle in the control unit 46. The second shuttle of the glass G through zones A and B may or may not be required depending upon the thickness of the glass sheet as described above.

Figure 3:
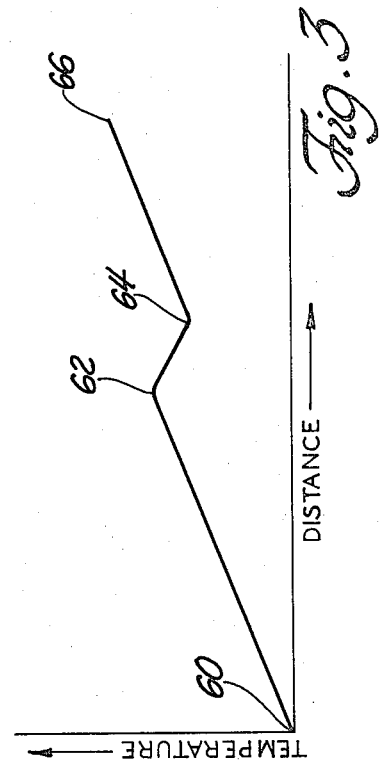
FIG. 3 is a graph of temperature versus distance for a glass sheet within the furnace of the apparatus of FIG. 2.

FIG. 3 is a graph representative of glass temperature versus distance as the sheet of glass G traverses the furnace 30. More specifically, as the glass sheet G enters zone A it is normally at room temperature as indicated by point 60. As the glass sheet G passes from zone A and enters zone B its temperature has been increased to a level sufficient for pyrolysis as indicated by point 62. For a typical metal oxide coating the temperature required for pyrolysis is between 950°–1100° F. As the glass is sprayed in zone B its temperature decreases by approximately 200° F. as indicated by point 64. After spraying the glass sheet G is re-heated in zone C to both restore the heat lost by the spraying and to bring the sheet to a temperature level sufficient for tempering. The increase in temperature through zone C is indicated by point 66.

Figure 6:
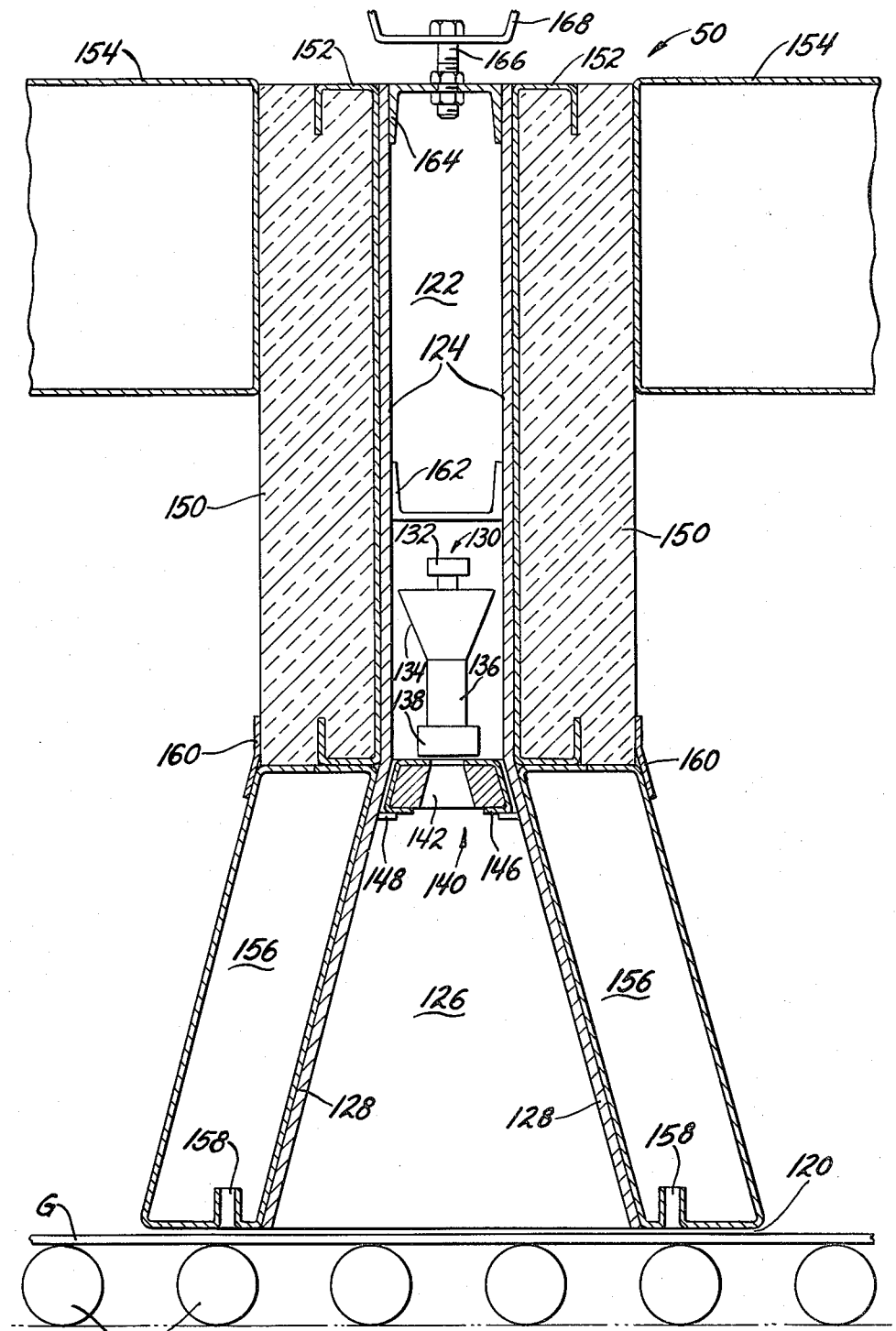
FIG. 6 is a cross-sectional view of a spraying station of the type used in the apparatus of FIGS. 2 and 4.

Reference is now made to FIG. 6 which is an enlarged, cross-sectional view of the spraying station 50. The spraying station 50 is disposed in the furnace above the rollers 34 defining the roller hearth such that there is a clearance 120 between the bottom of the spraying station and a sheet of glass G passing thereunder.

The spraying station 50 has a central longitudinal opening including an upper section 122 bounded by spaced, parallel walls 124, and a lower section 126 bounded by downwardly diverging walls 128. A spray gun, indicated generally at 130, is disposed within the central opening just above the juncture of the upper section 122 and the lower section 126. The spray gun 130 has an inlet 132 which is connected to a source (not shown) of coating composition. The coating composition is generally made up of an active ingredient carried by an inactive liquid vehicle. The active ingredient will undergo a pyrolytic reaction with the glass in the air when the glass is of sufficient temperature for the reaction. The body of the spray gun includes an upper conical section 134 which tapers into a lower cylindrical section 136. A discharge head 138 is mounted on the lower end of the cylindrical section 136.

The spray gun 130 issues a spray of coating composition which is atomized in an atomizing head, indicated generally at 140. The atomizing head 140 has a conical aperture 142 formed in a body 144. The aperture 142 is in alignment with the discharge head 138 of the spray gun 130. The body 144 is contained within a frame 146 which is supported on a pair of cantilever mounts 148.

The upper section 122 is surrounded by a pair of blocks 150 which insulate the upper section from the relatively high heat of the furnace. The blocks 150 are mounted on C-shaped clamps 152. The furnace roof 154 bounds the upper portion of the insulating blocks 150.

The lower section 126 has a pair of vacuum chambers 156 on its opposed lateral sides. Each of the vacuum chambers 156 is in communication with the lower section 126 through an opening 158 formed in its lower wall. The vaporized inactive vehicle and by-products of the pyrolytic reaction with the glass can be drawn off by the development of the vacuum in the chambers 156. The chambers 156 can be connected with a disposal duct (not shown) for suitable discharge of the inactive vehicle and by-products.

The upper section 122 includes a pair of spacers 162 and 164 interposed between the parallel walls 124. The upper spacer 164 has a bore formed in its central section to receive a bolt 166. The bolt 166 may be attached to a suspended support member 168 to provide overhead support for the spraying station 50.

Figure 4:
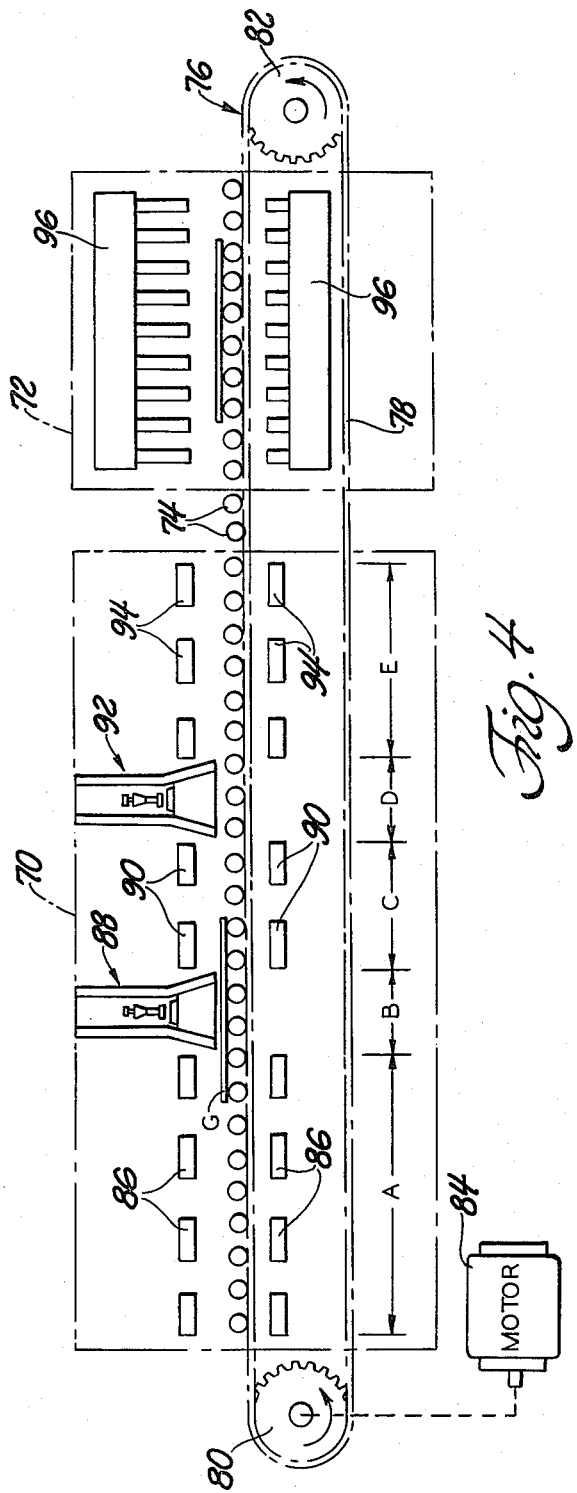
FIG. 4 is a second embodiment of an apparatus for carrying out the continuous filming and tempering process of the present invention.

Reference is next made to FIG. 4 which shows an alternative embodiment of apparatus for continuous filming and tempering of a sheet of glass. The apparatus in FIG. 4 is particularly adapted for the filming and tempering of relatively thin sheet glass. As was previously mentioned, the glass which is relatively thin will contain insufficient thermal energy to sustain a temperature sufficient for pyrolysis for the length of time required for pyrolysis. In these instances, the sheet glass is re-heated and resprayed before tempering.

The apparatus includes a furnace 70 and a quench station 72. The sheet of glass G is transported through the furnace 70 and the quench station 72 on a roller hearth defined by a plurality of spaced, parallel rollers 74.

A conveyor drive, indicated generally at 76, includes a continuous drive chain 78 trained over a pair of sprockets 80 and 82 disposed at opposite ends of the juxtaposed furnace 70 and quench station 72. The upper portion of the chain 78 supports and engages the rollers 74. The sprocket 80 is rotationally driven in the direction indicated by the arrow by a motor 84.

The furnace 70 is divided into five distinct zones A, B, C, D and E. Each zone performs a respective function within the furnace as will be described presently.

The furnace zone A receives a pre-cut sheet of glass which is normally at room temperature and heats the glass sheet to a temperature sufficient for pyrolysis. The zone includes a plurality of heating elements 86 for this purpose.

The furnace zone B includes a spraying station 88 which performs initial spraying of coating composition onto a glass sheet G. The spraying station 88 is similar in structure to the spraying station 50 of FIG. 2.

The furnace zone C provides re-heating of the glass sheet to restore heat lost by the spraying in zone B. This zone includes a plurality of heating elements 90. After traversing zone C the glass sheet G will be restored to a temperature sufficient for pyrolysis.

The furnace zone D includes a secondary spraying station 92 for re-spraying the glass sheet G to complete the filming operation. The spraying station 92 is similar in structure to the spraying station 50 of FIG. 2.

The furnace zone E receives the filmed glass sheet G and both restores the heat lost by the secondary spraying and increases the temperature of the glass sheet to a level sufficient for tempering. The zone E includes a plurality of heating elements 94.

The quench station 72 receives the filmed and heated glass sheet G and subjects it to rapid cooling to effect tempering. The quench station 72 includes a pair of blastheads 96 disposed above and below the roller hearth. The blastheads 96 force cool air onto the surfaces of the glass sheet to provide the rapid cooling required for tempering.

Figure 5:
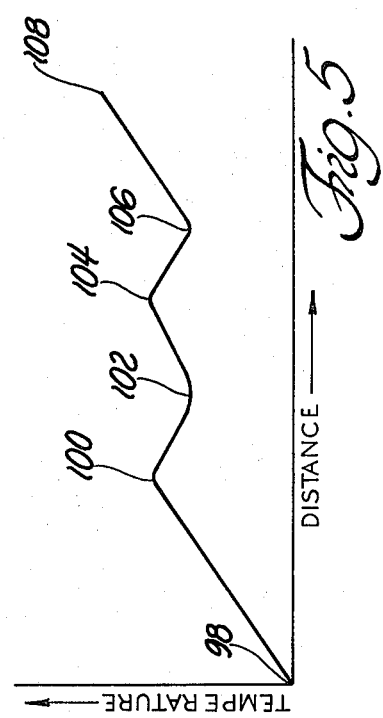
FIG. 5 is a graph of temperature versus distance for a glass sheet within the furnace of the apparatus of FIG. 4.

FIG. 5 is a graph which represents glass temperature versus distance as the glass sheet G traverses the furnace 70. As the glass enters the furnace it is normally at room temperature as indicated at point 98. The glass sheet is heated through zone A to a temperature sufficient for pyrolysis as indicated at point 100. The initial spraying operation in zone B causes a drop in temperature to a level below that required for pyrolysis as indicated in point 102. The re-heating of the glass sheet in zone C restores the temperature of the glass sheet to a level sufficient for pyrolysis as indicated at point 104. The secondary spraying operation in zone D again causes a drop in heat as indicated in point 106. The final heating in zone E both restores the heat lost by the secondary spraying operation and increases the temperature to a level sufficient for tempering.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims the invention may be practiced otherwise than as specifically described.

The embodiments of the invention in which an exclusive property or privilege is claimed are defined as follows:

1. A method for manufacturing a coated, tempered glass sheet comprising the steps of:
    heating the glass sheet to a temperature sufficient for pyrolysis;
    applying to the glass sheet, while at a temperature sufficient for pyrolysis, a coating composition which reacts on the surface of the glass to form a pyrolytic coating thereon;
    immediately thereafter applying additional heat to the glass sheet for restoring to the glass sheet heat lost during the application of said coating, whereby the sheet is again heated to a temperature sufficient for pyrolysis;
    immediately, and while the glass sheet remains at a temperature sufficient for pyrolysis, applying additional coating composition to the glass sheet thereby to form an additional thickness of pyrolytic coating thereon;
    immediately thereafter applying additional heat to the coated glass sheet sufficient to heat the glass sheet to a temperature sufficient for tempering; and then quenching the glass sheet to effect tempering.

2. Apparatus for coating a glass sheet with a pyrolytic film of predetermined thickness by applying to the glass sheet a material adapted to pyrolytically react on the surface of the glass sheet to form the pyrolytic film thereon while the glass sheet is at a temperature sufficient for pyrolysis of said material and for thereafter tempering the glass sheet, said apparatus comprising:
    an initial heating zone for heating the glass sheet to said temperature;
    an initial coating zone for applying said material to said glass sheet while at said temperature;
    a subsequent heating zone for heating the glass sheet to said temperature;
    a subsequent coating zone for applying said material to said glass sheet while at said temperature;
    a station for heating the glass sheet to a temperature sufficient for tempering;
    a quenching station for rapidly cooling the glass sheet to effect tempering thereof;
    conveyor means for moving the glass sheet through said apparatus; and
    drive means for driving said conveyor means to move the glass sheet into said initial heating zone for a period to heat the glass sheet to the temperature sufficient for pyrolysis of said material, then into a said initial coating zone for a period to apply to the glass sheet only sufficient of said material to form the pyrolytic film to a thickness less than said predetermined thickness, thereafter into said subsequent heating zone for a period to heat the glass sheet to a temperature sufficient for pyrolysis of said material; then into said subsequent coating zone for additional application of said material to said glass sheet to increase the thickness of said pyrolytic film to said predetermined thickness, and thereafter sequentially into said station for heating the glass sheet to a temperature sufficient for tempering and into said quenching station.

3. Apparatus for coating a glass sheet with a pyrolytic film of predetermined thickness by applying to the glass sheet a material adapted to pyrolytically react on the surface of the glass sheet to form the pyrolytic film thereon while the glass sheet is at a temperature sufficient for pyrolysis of said material and for thereafter tempering the glass sheet, said apparatus comprising:
    a heating zone for heating the glass sheet to said temperature;
    a coating zone for applying said material to said glass sheet while at said temperature;
    a station for heating the glass sheet to a temperature sufficient for tempering;
    a quenching station for rapidly cooling the glass sheet to effect tempering thereof;
    conveyor means for moving the glass sheet through said apparatus, at least that portion of said conveyor means in said heating zone and said coating zone being reversible thereby to move the glass sheet first in one direction and then in an opposite direction;
    drive means for driving said conveyor means; and
    control means for actuating said drive and conveyor means to move the glass sheet into said heating zone for a period to heat the glass sheet to the temperature sufficient for pyrolysis of said material, then into said coating zone for a period to apply to the glass sheet only sufficient of said material to form the pyrolytic film to a thickness less than said predetermined thickness, thereafter back into said heating zone for a period to heat the glass sheet to a temperature sufficient for pyrolysis of said material, then again into said coating zone for additional application of said material to said glass sheet to increase the thickness of said pyrolytic film to said predetermined thickness, and thereafter sequentially into said station for heating the glass sheet to a temperature sufficient for tempering and into said quenching station.

* * * * *